(12) United States Patent
Adkisson et al.

(10) Patent No.: US 6,403,393 B1
(45) Date of Patent: Jun. 11, 2002

(54) DEVICE HAVING INTEGRATED OPTICAL AND COPPER CONDUCTORS AND METHOD OF FABRICATING SAME

(75) Inventors: James W. Adkisson, Jericho; Paul W. Pastel, Essex Junction; Anthony K. Stamper, Williston, all of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/388,163

(22) Filed: Sep. 1, 1999

(51) Int. Cl.$^7$ .................................................. G02B 6/00
(52) U.S. Cl. ............................ 438/31; 216/24; 385/129
(58) Field of Search ........................... 216/24; 438/31; 385/129, 130, 131, 144

(56) References Cited

U.S. PATENT DOCUMENTS

| | | |
|---|---|---|
| 4,495,412 A | 1/1985 | Thoone et al. |
| 4,606,602 A | 8/1986 | Unger et al. |
| 4,715,672 A | 12/1987 | Duguay et al. |
| 4,776,087 A | 10/1988 | Cronin et al. |
| 4,851,025 A | 7/1989 | Siefert et al. |
| 4,901,329 A | 2/1990 | Leas |
| 5,002,352 A | 3/1991 | Bradley et al. |
| 5,444,805 A | 8/1995 | Mayer |
| 5,518,965 A | 5/1996 | Menigaux et al. |
| 5,533,156 A | 7/1996 | Maxwell et al. |
| 5,565,693 A | 10/1996 | Sasaki et al. |
| 5,604,835 A | 2/1997 | Nakamura et al. |

OTHER PUBLICATIONS

"Waveguides on a Semiconductor Chip", by J. E. Cronin, T. J. Hartswick and M. A. Leach, Research Disclosure, Jul. 1998, No. 291, Kenneth Mason Publications Ltd, England.
"Process to Form a Moveable Micromachine Hinge", by R. Battaline and J. Cronin, IBM Technical Disclosure Bulletin, vol. 32, No. 3A, Aug. 1989.
"Integrated Process for Silicon Nitride Waveguide Fabrication", by P. G. May and J.D. Warnock, IBM Technical Disclosure Bulletin, vol. 33, No. 2, Jul. 1990.

Primary Examiner—Randy Gulakowski
Assistant Examiner—J Smetana
(74) Attorney, Agent, or Firm—DeLio & Peterson, LLC; John J. Tomaszewski; Howard J. Walter, Jr.

(57) ABSTRACT

A method is provided for making optical waveguide structures in a semiconductor device wherein a rectangular cross-section low index of refraction material is encapsulated in a trench by a high index of refraction material. The waveguide structures may be made in a device containing copper conductors in trenches by forming new trenches to hold the optical waveguide. Copper conductor containing trenches may also be made in an electronic component containing waveguide structures and a further method is provided for forming an optical waveguide structure by replacing a copper containing trench with the waveguide structure in an electronic component having a plurality of copper containing trenches. All the methods use conventional techniques so that the fabrication of a semiconductor device containing both optical waveguide structures and copper conductor structures can be made both efficiently and economically.

9 Claims, 5 Drawing Sheets

US 6,403,393 B1

DEVICE HAVING INTEGRATED OPTICAL AND COPPER CONDUCTORS AND METHOD OF FABRICATING SAME

BACKGROUND OF THE INVENTION

1. Field of the Invention

The present invention relates to the fabrication of semiconductor electronic components, and in particular, to the fabrication of waveguides or optical conductive structures on a semiconductor device and to the integration of the fabrication of the optical conductor with the fabrication of the copper conductor in the semiconductor device.

2. Description of Related Art

Electronic devices having both an optical conductor pathway and a copper conductor pathway are of increasing importance in the electronic industry since both light and electricity can be used together to provide enhanced functions for the electronic device. The fabrication of copper conductors on a semiconductor device is well known in the art and basically comprises forming a trench or opening in a dielectric and filling the trench with copper metal.

With regard to the optical conductor in the electronic device, they are usually constructed as planar waveguide films for guiding light in the electronic component. The waveguides are typically used as directional couplers, filters, switches and optical interconnections for electronic circuits. In general, a waveguide comprises a first layer of material such as silicon dioxide ($SiO_2$), an intermediate layer of a material which has a lower refractive index than that of the $SiO_2$ followed by a top layer of the first layer $SiO_2$ material. In these type waveguides, optical power is confined to the lower index layer by the standard process of total internal reflection at the interface between the two layers.

The efficient and cost effective fabrication of electronic devices containing both optical conductor structures and copper or metal conductor structures using conventional processes is also highly desirable in the electronic component fabrication industry.

Bearing in mind the problems and deficiencies of the prior art, it is therefore an object of the present invention to provide a method for making an optical waveguide in an electronic component containing copper conductors such as a semiconductor device.

It is another object of the present invention to provide a method for making an optical waveguide in an electronic component wherein the electronic component has trenches containing copper conductors some of which copper conductor trenches are to be replaced and fabricated for use as a waveguide.

A further object of the invention is to provide a method for making copper conductor structures in an electronic component containing optical waveguide structures using some of the waveguide trenches as a copper containing trench.

Another object is to provide an optical waveguide transmission system integrated with a semiconductor device made using the method of the invention.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, to a method for making an optical structure waveguide in an electronic component comprising the steps of:

forming a trench or other opening in a dielectric layer;

depositing a first conformal layer of $SiO_xN_yH_z$ or other dielectric material having a first index of refraction and preferably graded from an index refraction higher at the beginning of the deposition to a lower index at the end of the deposition such as 2.0 to 1.46;

depositing on the first conformal layer a second core conformal layer of $SiO_2$ or other dielectric material having a second index of refraction substantially equal to the low index of refraction of the first graded conformal layer;

etching the second core conformal layer to a desired embedded vertical thickness in the trench in the form of a rectangle the etch embedded layer being bounded on the bottom and sidewalls by the first conformal layer;

depositing on the etched substrate a third conformal layer of $SiO_xN_yH_z$ or other dielectric material having a third index of refraction higher than the second index of refraction and preferably graded from a low index of refraction at the beginning of the deposition substantially equal to the index of refraction of the second index of refraction of the third conformal layer to a high index at the end of the deposition; and planarizing the dielectric layer until the first and third conformal layers are planar at the surface of the dielectric with the second core conformal layer in the trench being surrounded at the bottom and side faces thereof by the first conformal layer and on the top by the third conformal layer.

In another aspect, the present invention relates to a method for making an optical waveguide structure in an electronic component containing copper conductor structures comprising the steps of:

fabricating copper conductor structures in a dielectric layer with the copper layer being planar with the dielectric layer;

depositing a conformal protective layer such as $SiN_xH_y$ over the device and the copper conductor structures;

depositing a masking layer on the protective layer;

defining a portion of the masking layer to contain an optical waveguide structure in the dielectric layer;

etching the masking layer exposing the protective layer;

etching the protective layer and dielectric layer to the desired trench depth; and forming the optical waveguide structure as described above.

In another aspect of the invention a method is provided for making copper conductor structures in openings containing waveguide structures in an electronic component containing optical waveguide structures comprising the steps of:

forming openings in a dielectric layer;

forming optical waveguide structures in the openings;

depositing a masking layer on the dielectric layer and optical waveguide structure;

defining a portion of the masking layer where a copper conductor structure is desired to be formed in place of the waveguide structure;

etching the waveguide structure;

stripping the mask;

depositing barrier material and copper in the trench; and planarizing the electronic component by chemical-mechanical polishing or other planarizing means to form a planar waveguide structure and copper conductor surface.

In a further aspect, the present invention relates to a method for raking an optical waveguide structure in a copper containing trench in an electronic component having a plurality of copper containing trenches comprising the steps of:

forming an electronic component having a plurality of copper containing trenches;

depositing a conformal protective layer over the substrate surface;

depositing a mask on top of the protective layer;

defining and etching the mask at a copper containing trench where an optical waveguide is desired;

etching the copper from the trench; and forming the waveguide in the etched trench as described above.

In another aspect of the invention an optical waveguide transmission system integrated with a semiconductor device is provided comprising:

a dielectric having a trench therein;

an optical conductor in the trench, having a second index of refraction, said conductor having a substantially rectangular cross-section; and an encapsulating optical medium in the trench surrounding the optical conductor having a first index of refraction higher than the second index of refraction.

The optical waveguide transmission system is formed in a trench or opening in a dielectric layer of an electronic component.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1A:
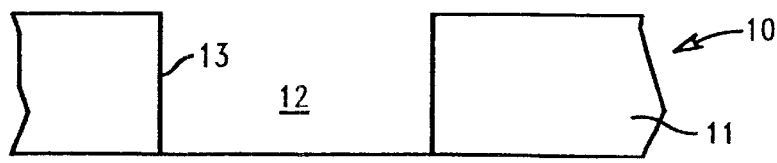
FIGS. 1A–1F show, in sequence, the making of an optical waveguide structure in a dielectric substrate according to the invention.

In describing the preferred embodiment of the present invention, reference will be made herein to FIGS. 1A–4E of the drawings in which like numerals refer to like features of the invention. Features of the invention are not necessarily shown to scale in the drawings.

Figure 1B:
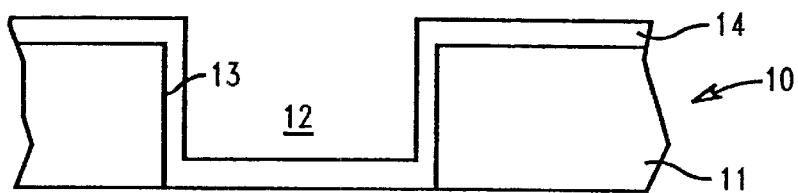

FIGS. 1A–1F show a method for making an optical waveguide structure in an inner layer dielectric according to the invention. The inner layer dielectric is typically one layer in a multilayer electronic component. FIG. 1A shows an inner layer dielectric 11 with a trench generally as 10 with the trench shown as 12. FIG. 1B shows a first conformal layer 14 over the walls of the trench. The first conformal layer 14 preferably has a varying index of the refraction from a high value to a low value at the end of the deposition. Preferably, the index of the refraction will vary from about 2.0 to 1.46 at the end of the deposition.

Figure 1C:
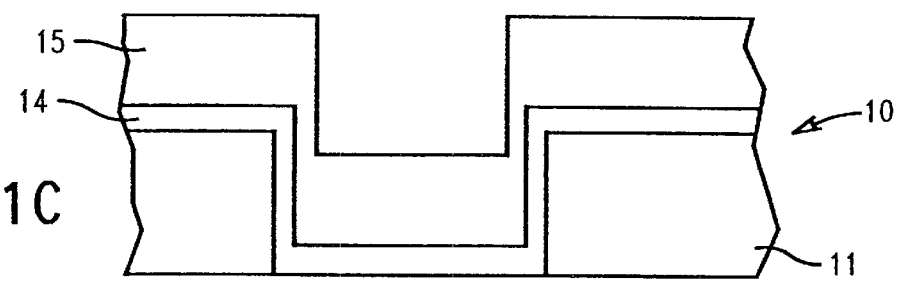
Figure 1D:
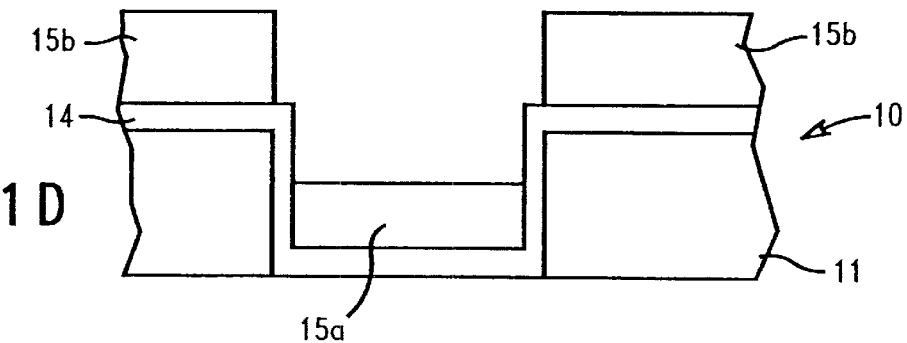
Figure 1:
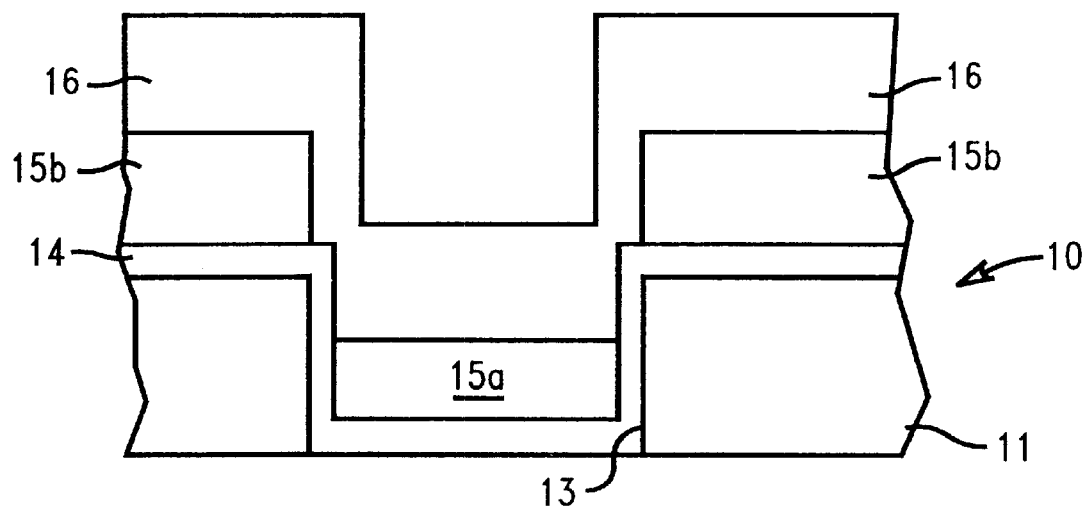
Figure 1:
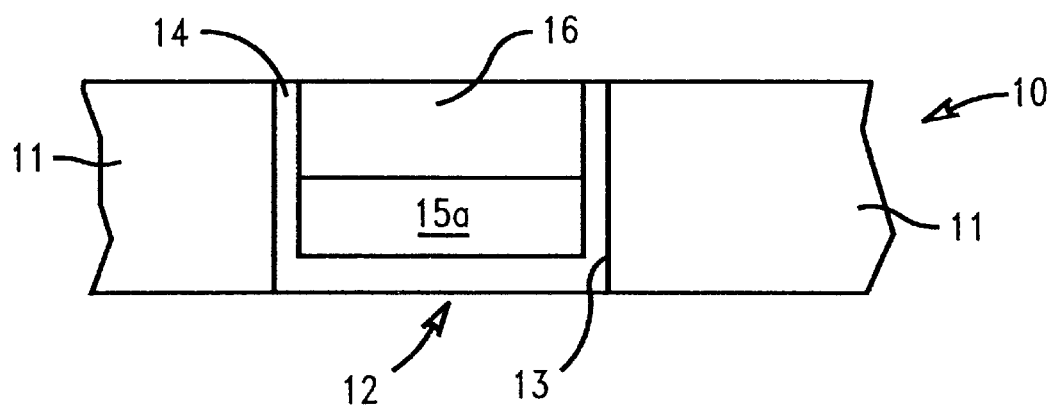

FIG. 1C shows a second conformal layer 15 formed over the first conformal layer 14. The second conformal layer 15 has a low index of refraction typically the same or about the same as the last deposited low index refraction of the first conformal layer 14. FIG. 1D shows the etching of the second conformal layer 15 to a desired height in trench 12 shown in cross section as 15a. Thus, second conformal layer 15a is now enclosed on three sides by first conformal layer 14. The second conformal layer 15 when etched to form 15a is etched to the side faces of second conformal layer 14 and also results in surface layer 15 also being etched which is now shown as surface conformal layer 15b.

FIG. 1E shows the deposition of a third conformal layer over the substrate, the third conformal layer 16 having an index of refraction stating at the beginning of deposition with a low value preferably equal to the index refraction of the second conformal layer 15 and ending at the end of deposition with a high index of refraction. For the preferred waveguide structure the index of refraction would vary for the third conformal layer 16 from about 1.46 at the beginning of deposition to about 2.0 and the end of deposition.

The structure of FIG. 1E is then planarized using for example chemical-mechanical polishing to form the finished waveguide structure shown in FIG. 1F. Accordingly, an inner layer dielectric 11 having a trench 12 and walls 13 has a first conformal layer 14. The second conformal layer 15a has a rectangular cross-section and is encased on the sides and bottom thereof by the first conformal layer 14 and on the top surface by third conformal layer 16.

The first conformal layer 14 is preferably a material such as $SiO_xN_yH_z$ and preferably has a varying index of refraction as noted above and may also be deposited by techniques such as plasma enhanced CVD and high density plasma CVD. The second conformal layer 15 forms the low index of refraction layer of the waveguide structure in which the light will be transmitted in the semiconductor device. This waveguide structure is typically a material such as $SiO_2$ and has a low index of refraction. Similarly, the third conformal layer 16 is similar to the first conformal layer and is also deposited by conventional techniques such as CVD.

Referring now to FIGS. 2A–2E a method is shown in sequence for making an optical waveguide structure in a dielectric layer containing copper containing trenches. Thus, an inner layer dielectric with a trench is shown generally as 18 and the trench shown as 18a. The inner layer dielectric 19 with trench 18a is provided with a liner 20 such as one or more refractory metals or nitridized Ta, Ti or W such as TaN, TiN and WN. Copper 21 fills the trench 18a to the upper surface of inner layer dielectric 19. This is a typical semiconductor structure copper containing trench in an inner layer dielectric layer of a multilayer electronic component.

Figure 2A:
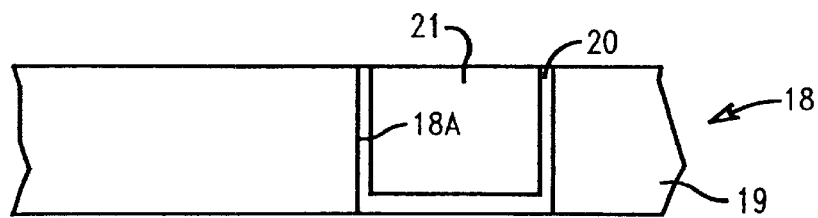
FIGS. 2A–2E show, in sequence, the making of an optical waveguide structure in a dielectric layer containing copper conductor containing trenches.
Figure 2B:
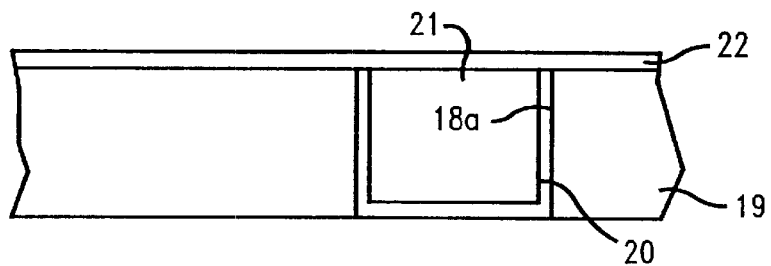

FIG. 2B shows a protective layer 22 such as $Si_3N_4$ over the surface of the inner layer dielectric 19 and copper structure 21.

Figure 2C:
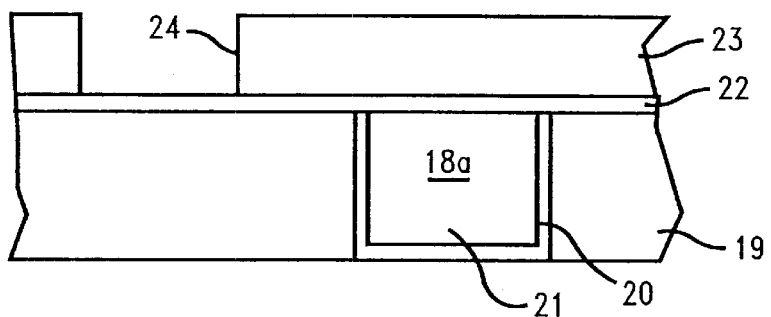

FIG. 2C shows a photoresist mask 23 on the surface of the protective layer 22 which has been defined with an opening 24. The opening 24 will be at a position on the inner layer dielectric 19 surface at which an optical waveguide structure is desired.

Figure 2D:
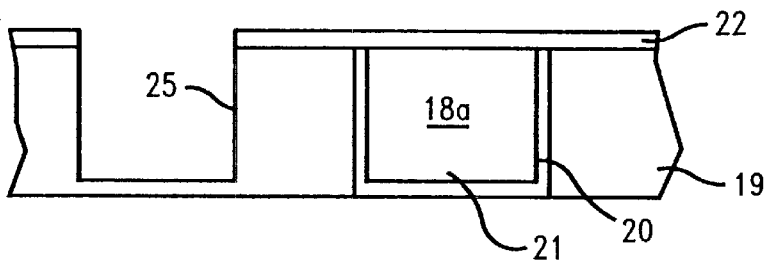
Figure 2E:
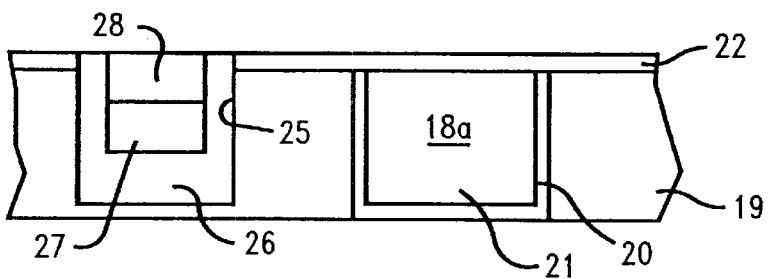

Thus, in FIG. 2D, the protective layer 22 and dielectric 19 are then etched at opening 24 forming an optical waveguide structure trench 25. The waveguide structure 57 as shown in FIG. 2E would then be made using the method shown hereinabove in FIGS. 1A–1F. Thus, a low index of refraction waveguide rectangular cross-section core 27 is surrounded on the side faces thereof and bottom by a layer 26 having a varying index of refraction from a high value away from the core 27 to a lower value adjacent the core 27. Likewise, a varying index of refraction material 28 is disposed on the upper surface of core 27 and also has a varying index of refraction from a low value at the surface of core 27 to a high value away from the surface of core 27. The waveguide is shown generally as 57.

Referring now to FIGS. 3A–3D these figures show, in sequence, the making of a copper containing structure in a dielectric containing a plurality of optical waveguide structures where a waveguide structure is replaced by a copper containing structure. Thus, in FIG. 3A, an inner layer dielectric with two waveguides is shown generally as 30. The waveguide containing structure shown generally as 58 comprises an inner layer dielectric 31 having two trenches 32. The waveguide structure comprises a rectangular cross-section core of low index refraction material 35 surrounded on its side faces and bottom by a waveguide containing material 34 having a varying index of refraction from low index of refraction adjacent the core to a high index at the trench 32 wall. A similar material 36 is shown on the upper surface of waveguide core 35. These waveguide structures may have been prepared using the sequence of operation shown in FIGS. 1A–1F.

Figure 3A:
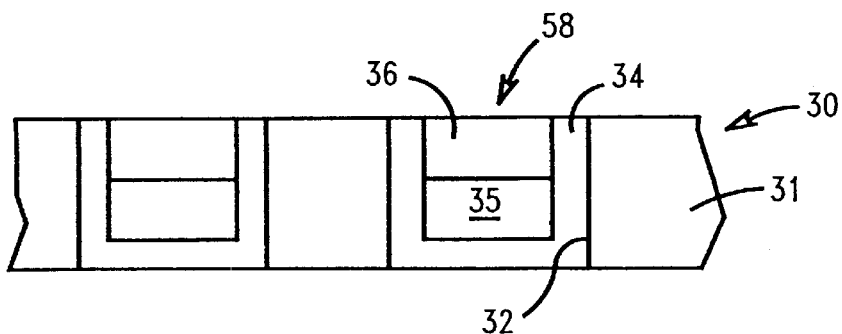
FIGS. 3A–3D show, in sequence, the making of a copper containing structure in a dielectric containing a plurality of optical waveguide structures where one of the waveguide structures is replaced by a copper containing structure.
Figure 3B:
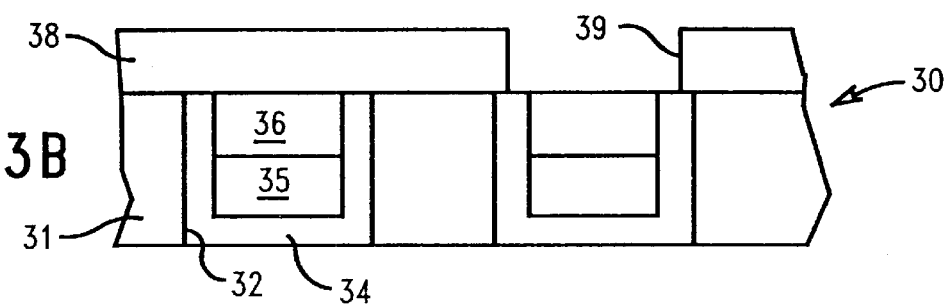

FIG. 3B shows the deposition of a photoresist mask layer 38 on the surface of the waveguide structure 30. The photoresist mask layer 38 is provided with an opening 39 at a point on the surface of the waveguide structure in which a copper containing trench is to be provided.

Figure 3C:
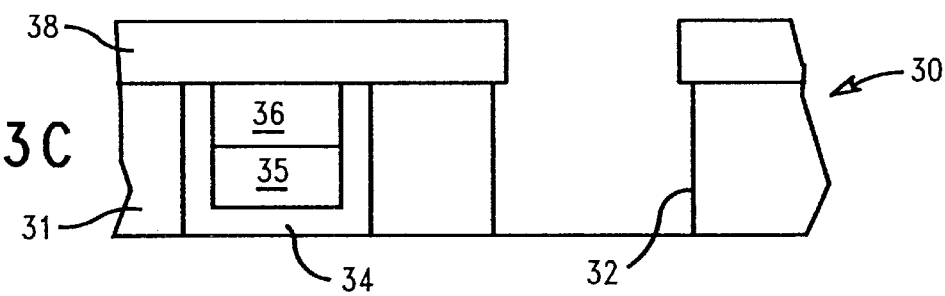

FIG. 3C shows etching of the waveguide 58 from the waveguide containing structure 30 leaving trench 32 therein.

Figure 3D:
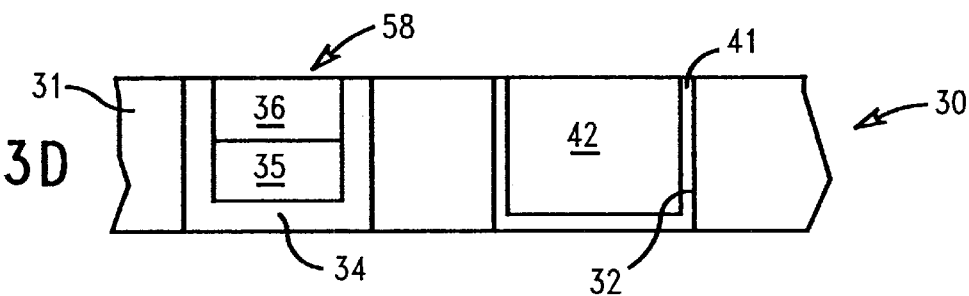

Copper may then be plated in the opening forming a copper containing structure trench 42 as shown in FIG. 3D. Typically, a seed layer 41 is provided to facilitate plating of the copper 42. In the final structure shown in FIG. 3D, a copper containing trench 42 and a waveguide 58 are shown side by side in the inner layer dielectric 31.

Referring now to FIGS. 4A–4E, these figures show in sequence the making of an optical waveguide structure in a dielectric layer containing a plurality of copper containing structures where a copper containing structure is to be replaced by an optical waveguide structure. Thus, in FIG. 4A, an inner layer dielectric 44 with two copper containing trenches 45 is shown generally as 43. A conductive liner 46 is provided on the surface of inner layer dielectric 44 and in the trench 45. Copper 47 is shown deposited on the conductive liner 46 in the trenches 45. The copper is polished by CMP and stopped on conductive liner 46, go that the copper is Damascened into the trench.

Figure 4A:
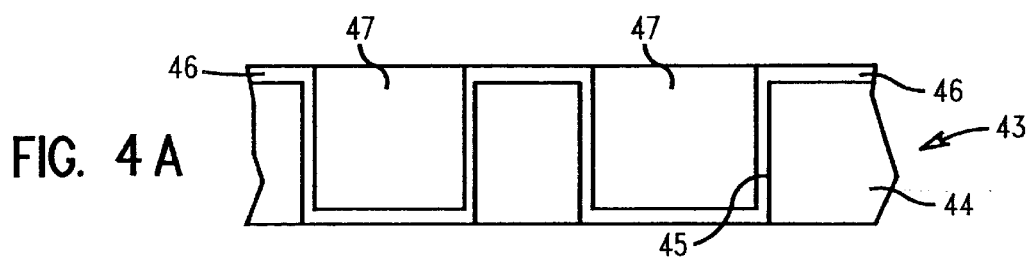
FIGS. 4A–4E show, in sequence, the making of an optical waveguide structure in a dielectric layer containing a plurality of copper containing structures where one of the copper containing structures is replaced by the optical waveguide structure.
Figure 4B:
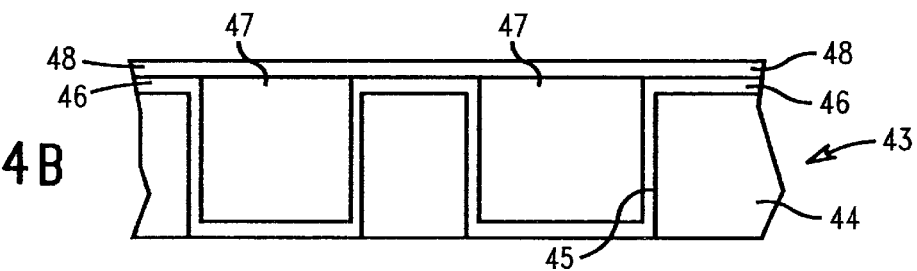
Figure 4C:
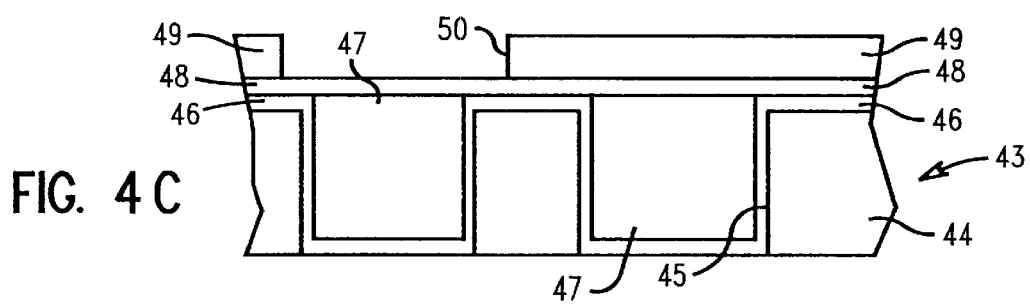

A protective layer 48 of $Si_3N_4$ is provided on the surface of the copper containing structure 43 as shown in FIG. 4B. In FIG. 4C, a photoresist mask 49 is shown deposited on the surface of protective layer 48 and has been provided with an opening 50 where it is desired to replace a copper containing trench with an optical waveguide structure.

Figure 4D:
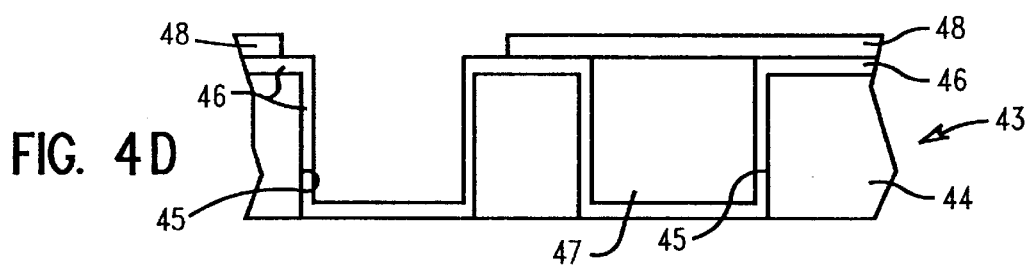
Figure 4E:
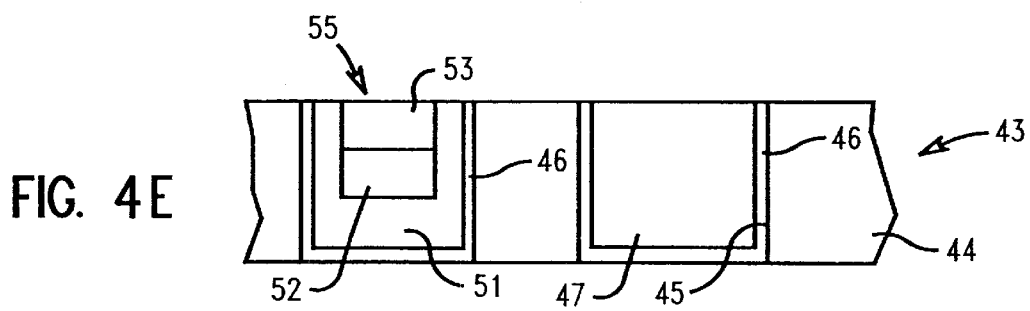

FIG. 4D shows etching of the protective layer 48 and copper 47 leaving an open trench 45. The open trench 45 still has a conductor liner 46. The waveguide may then be made in the trench 45 using the method as shown in FIGS. 1A–F.

The waveguide structure is shown as 55 and comprises a rectangular cross-sectional core of low index of refraction material 52 surrounded on the side faces and base thereof by a varying index of refraction material 51. The upper surface of core 52 has deposited thereon a varying index of refraction material 53.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for making an optical structure waveguide in an electronic component comprising the steps of:

forming a trench or other opening in a dielectric layer;

depositing a first conformal layer of a dielectric material having a first index of refraction over the dielectric layer and into the bottom and sides of the trench;

depositing a second core conformal layer of a dielectric material having a second index of refraction lower than the first index of refraction over the first conformal layer and into the bottom and sides of the trench;

etching the second core conformal layer to a desired embedded vertical thickness in the trench in the form of a rectangle where the etch embedded layer is bounded on the bottom and sidewalls by the first conformal layer;

depositing on the etched surface a third conformal layer of a dielectric material having a third index of refraction higher than the second index of refraction;

planarizing the dielectric layer until the first and third conformal layers are planar at the surface of the dielectric with the second core conformal layer in the trench being surrounded at the bottom and side faces thereof by the first conformal layer and on the top by the third conformal layer.

2. The method of claim 1 wherein the first and third conformal layers are $SiO_xN_yH_z$.

3. The method of claim 2 wherein the second core conformal layer is $SiO_2$.

4. A method for making an optical waveguide structure in an electronic component containing copper conductor structures comprising the steps of:

fabricating copper conductor structures in a dielectric layer with the copper layer being planar with the dielectric layer;

depositing a conformal protective layer over the device and the copper conductor structures;

depositing a masking layer on the protective layer;

defining a portion of the masking layer to contain an optical waveguide structure in the dielectric layer;

etching the masking layer exposing the protective layer;

etching the protective layer and dielectric layer to the desired trench depth;

depositing a first conformal layer of a dielectric material having a first index of refraction over the dielectric layer and into the bottom and sides of the trench;

depositing a second core conformal layer of a dielectric material having a second index of refraction lower than the first index of refraction over the first conformal layer and into the bottom and sides of the trench;

etching the second core conformal layer to a desired embedded vertical thickness in the trench in the form of a rectangle where the etch embedded layer is bounded on the bottom and sidewalls by the first conformal layer;

depositing on the etched surface a third conformal layer of a dielectric material having a third index of refraction higher than the second index of refraction; and planarizing the dielectric layer until the first and third conformal layers are planar at the surface of the dielectric with the second core conformal layer in the trench being surrounded at the bottom and side faces thereof by the first conformal layer and on the top by the third conformal layer.

5. The method of claim 4 wherein the first and third conformal layers are $SiO_xN_yH_z$.

6. The method of claim 5 wherein the second core conformal layer is $SiO_2$.

7. A method for making an optical waveguide structure in a copper containing trench in an electronic component having a plurality of copper containing trenches comprising the steps of:

forming an electronic component having a plurality of copper containing trenches;

depositing a conformal protective layer over the substrate surface;

depositing a mask on top of the protective layer;

defining and etching the mask at a copper containing trench where an optical waveguide is desired;

etching the copper from the trench;

depositing a first conformal layer of a dielectric material having a first index of refraction over the dielectric layer and into the bottom and sides of the trench;

depositing a second core conformal layer of a dielectric material having a second index of refraction lower than the first index of refraction over the first conformal layer and into the bottom and sides of the trench;

etching the second core conformal layer to a desired embedded vertical thickness in the trench in the form of a rectangle where the etch embedded layer is bounded on the bottom and sidewalls by the first conformal layer;

depositing on the etched surface a third conformal layer of a dielectric material having a third index of refraction higher than the second index of refraction; and planarizing the dielectric layer until the first and third conformal layers are planar at the surface of the dielectric with the second core conformal layer in the trench being surrounded at the bottom and side faces thereof by the first conformal layer and on the top by the third conformal layer.

8. The method of claim 7 wherein the first and third conformal layers are $SiO_xN_yH_z$.

9. The method of claim 8 wherein the second conformal layer is $SiO_2$.

* * * * *